No. 839,781. PATENTED DEC. 25, 1906.
W. G. McGEE.
SPRING MOTOR.
APPLICATION FILED NOV. 14, 1905. RENEWED DEC. 1, 1906.
2 SHEETS—SHEET 1.
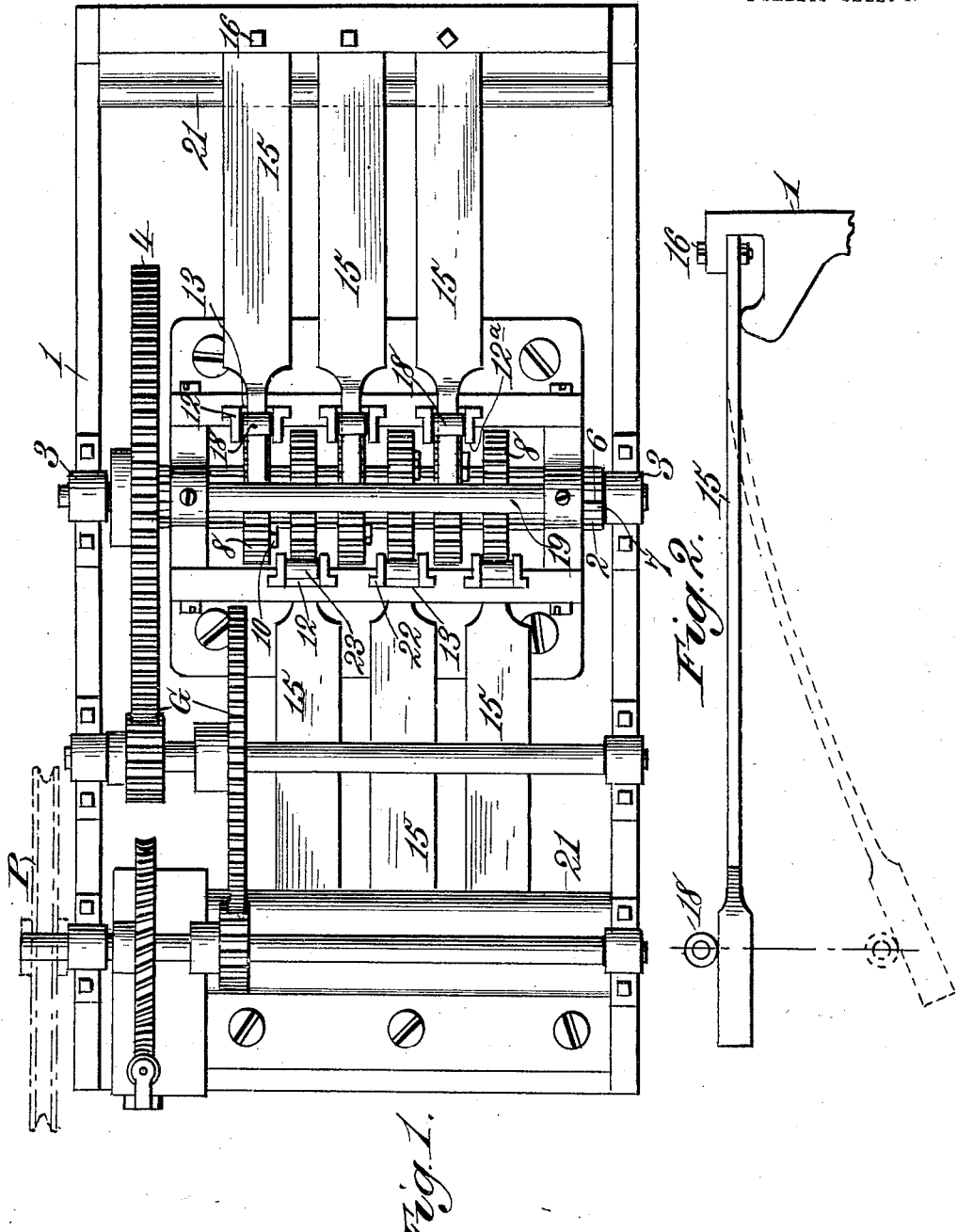
Witnesses.
Robert Smith
M. C. Walters
Inventor:
William Glenn McGee.
By E. B. Sherrill.
Attorney No. 839,781. PATENTED DEC. 25, 1906.
W. G. McGEE.
SPRING MOTOR.
APPLICATION FILED NOV. 14, 1905. RENEWED DEC. 1, 1906.
2 SHEETS—SHEET 2.
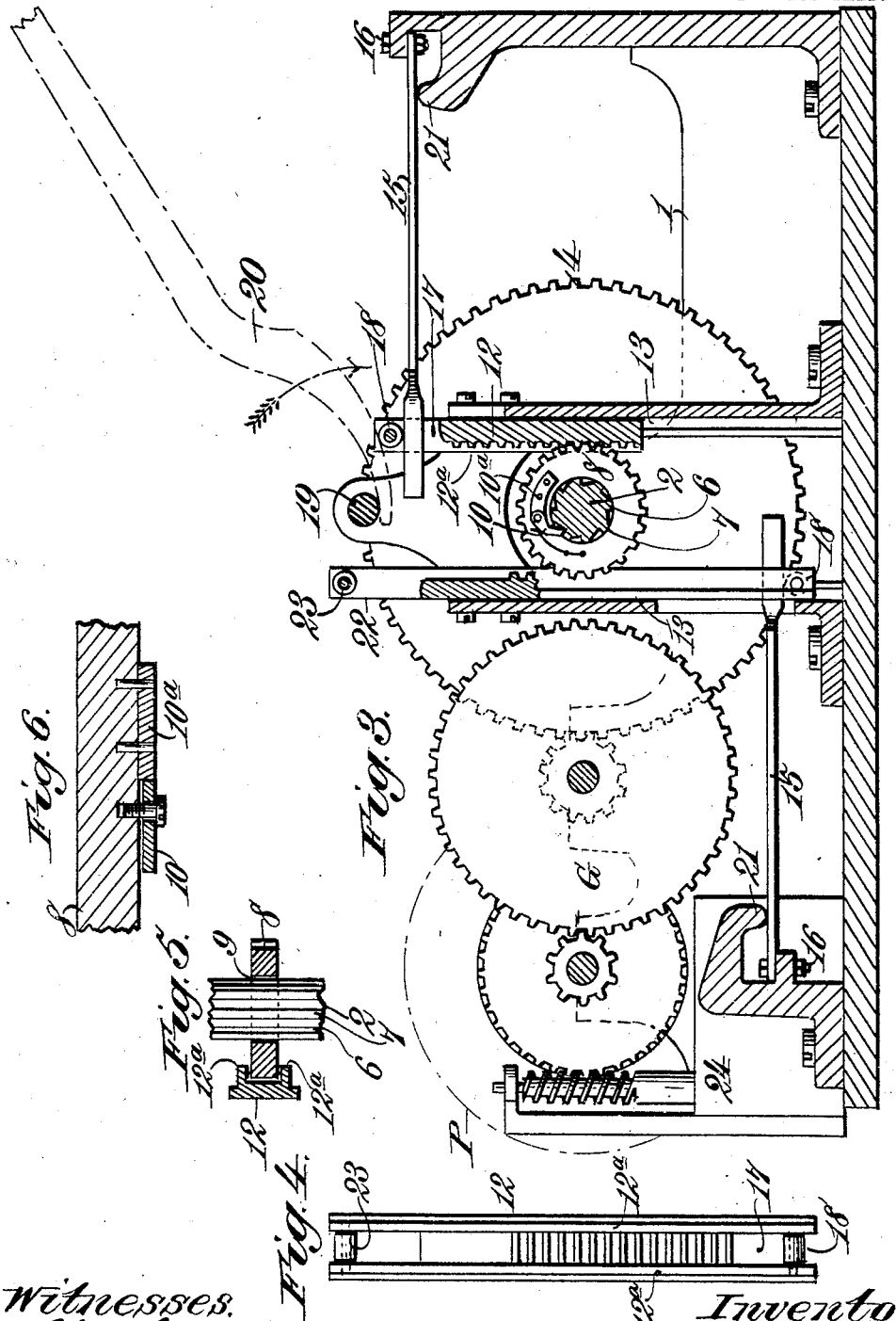
Witnesses.
Inventor:
William Glenn McGee.
By E. B. Sherill
Attorney

UNITED STATES PATENT OFFICE.

WILLIAM GLENN McGEE, OF HONEA PATH, SOUTH CAROLINA.

SPRING-MOTOR.

No. 839,781.  Specification of Letters Patent.  Patented Dec. 25, 1906.

Application filed November 14, 1905. Renewed December 1, 1906. Serial No. 345,935.

*To all whom it may concern:*

Be it known that I, WILLIAM GLENN MCGEE, a citizen of the United States, residing at Honea Path, in the county of Anderson and State of South Carolina, have invented new and useful Improvements in Spring-Motors, of which the following is a specification.

My invention relates to improvements in spring-motors, and has for its object to provide a motor of flat or leaf spring type whereby the expense and inconveniences incident to coil-spring motors are avoided.

The invention also has for its object to provide a spring-motor of simple construction and mode of operation, of few and economical elements, and of efficient operation.

The invention has for its further object to provide a spring-motor in which the force exerted by the spring element is constant or equal from the commencement to the ending of the working throw.

Finally, the invention has for its object to provide a spring-motor in which the working force may be augmented or decreased, as may be desired, by the introduction or withdrawal of spring elements and correlated parts.

The invention resides in a spring-motor having the features, elements, combinations of elements, and mode of operation hereinafter described.

That which is regarded as new will be set forth in the appended clauses of claim.

In the accompanying drawings, illustrating that which I regard as the best known embodiment of my invention, Figure 1 is a plan view showing my invention embodied in a multiple-spring machine; Fig. 2, a detail illustrating the compensating action of the motor-spring connection with the reciprocating rack. Fig. 3 is a view partly in section and partly in side elevation; Fig. 4, an elevation of the rack element; Fig. 5, a broken detail showing the shaft, the ratchet-wheel, and the rack; Fig. 6, a broken detail of the ratchet-wheel, the ratchet, and the resistance-plate associated therewith.

In the said drawings the reference-numeral 1 designates a frame in which the several operative elements may be arranged and supported and which may be of any suitable type.

The numeral 2 designates the driving-shaft for transmitting the spring energy to the accomplishment of the work designed, such as the driving of machinery or appliances of various kinds.

The motor is shown in an application of use for driving a train of speed-gearing G for imparting rapid rotation to a transmitting-pulley P, adapted to be geared to the work.

The shaft 2 may be mounted for rotation in bearings 3 in members of the frame 1 and, as shown, is formed or provided with a fixed or permanent transmitting element, (shown as a gear 4.) Said shaft is constructed as a ratchet-shaft, as best shown in Figs. 1 and 5, the teeth 6 of which are practically coextensive with the length of the shaft, whereby a pinion or a number of pinions may be readily strung loosely thereon—that is to say, to be capable of rotation independently of the shaft—or removed therefrom, or disposed at any operative point in the length thereof. Intervening the several teeth 6 are bearing-surfaces 7, which fit with the desired practical accuracy the perforations or bores of the pinion or pinions.

8 designates said pinions, and in order that the same may have a one-way connection with the shaft 2 they are provided with pawls 10, the noses of which pawls may be held to work by means of a spring 11. Any desired number of such one-way connection pinions may be disposed upon the shaft.

The pawl 10 is adapted to coöperate with ratchet-teeth 6 of the shaft 2, riding or slipping over said teeth in one direction of rotation of the pinion and positively engaging said teeth to impart rotation to said shaft in the other direction of rotation thereof. To relieve the pivot of the pawl of strain, it fits loosely in the latter and works against a resistance or thrust mass 10$^a$, formed with or secured to the pinion 8. In working mesh with the teeth of the pinion 8 is a reciprocating element, preferably and as shown, consisting of a rack 12, preferably working in a guide 13, by which its working position with relation to the pinion is maintained and by which it is guided in its reciprocating movements. The pinions 8 fit in between edge flanges 12$^a$ of the racks, as best shown in Fig. 5, whereby they are restrained from movement longitudinally of the shaft 2. The pinions serve as one suitable and convenient means for imparting rotation to the shaft from the reciprocating elements. Of racks 12 there may be any desired number, one for each pinion that may for the time being be used. The racks may be readily inserted into or withdrawn from the guide, which in a multiple-spring motor, as shown in Fig. 1, consists of a plate arranged parallel with the shaft 2, provided with a series of separate guideways 13, each adapted to receive a rack 12.

It will be observed upon reference to Fig. 3 of the drawings that said rack by its movement in one direction—to wit, its upward reciprocation in the arrangement shown at the right in this figure—actuates the corresponding pinion 8 and through the medium of the pawl 10 associated therewith causes rotation of the shaft 2 and transmission of power therefrom through the medium of the transmitting element or gear 4 and that in the reciprocation of the rack in the opposite direction the pinion will move independently of the shaft, the pawl riding or slipping over the teeth of and exerting no influence upon the shaft.

The active or shaft reciprocation of the rack 12 is imparted thereto by means of a leaf-spring 15 of any desired energy, suitably connected to or supported from a part of the frame 1, as by means of bolts 16, and operatively associated at its free end with the rack 12. There will be as many of these springs incorporated into the motor as there are racks and pinions, the connection of the springs, as at 16, to the frame being preferably one that will permit incorporation of and removal of the springs with facility. The components of the mechanism of my invention, as herein described, are extremely flexible. Where the motor is to perform work which may be accomplished by a single set of elements—that is to say, a single pinion, rack, and spring—it may be quickly organized for this purpose, and where the work to be performed requires greater energy additional sets of elements may be incorporated with ease and without especial skill. When a plurality of springs and intermediates to the shaft are utilized, it is preferable that they be arranged for operation at opposite sides of the shaft, as shown, obviating or counteracting the tendency of a disturbance of the position of the shaft which might exist if the force of a series of springs were applied to the shaft in a common line. It will be seen that while the racks and rack-actuating springs arranged at opposite sides of the shaft operate to rotate the shaft in the same direction the force of the elements at one side of the shaft tend to an upward strain thereon and those on the opposite side to a downward strain, thus counteracting or neutralizing each other and obviating all influence upon the shaft except that of rotation. When arranged for this manner of operation, the springs 15 on one side of the shaft may be arranged above and those at the opposite side below the shaft.

It is a valuable attribute of my invention that the energy of the spring at the end of its active stroke is equal to the energy at the commencement and throughout such stroke whereby a constant and equal force is transmitted to the shaft for rotation thereof. This is accomplished, according to the illustrated embodiment of my invention, by a compensating connection of the spring with the rack, whereby at the commencement of the active stroke of the racks the leverage, as it were, of the spring is maximum (see dotted lines, Fig. 2) and gradually decreases to the end of the stroke. (See full lines, Fig. 2.) This compensating connection, as shown, is accomplished by making the connection of the springs with the racks a loose or slip one, the free ends of the springs passing loosely into passages 17 in the racks, so that the racks will ride out upon the springs as the latter assume position of maximum tension and gradually ride in thereon as the spring tension decreases in the active stroke, reducing the leverage of the spring and equalizing the working energy thereof at all stages of its action.

A friction-roller 18 may be provided against which the spring may work to reduce friction.

Energy may be stored up in the spring by means of any suitable appliance for deflecting the free end thereof, and in the drawings I have shown one suitable arrangement for this purpose, according to which a fulcrum rod or bar 19 is supported from the frame 1. 20 designates a lever adapted to work against said rod or bar 19 as upon a fulcrum and to engage the rack, preferably as shown, working against the antifriction-roller 18. By manipulation of the lever the rack is moved in the proper direction to place the spring associated therewith under tension, as will be obvious. In this operation to relieve the strain from the connection of the springs with the frame a rail 21 may be provided to serve as an abutment or fulcrum to sustain the thrust of the spring during the operation of deflecting the latter to store the energy thereof.

When the motor is organized with a plurality of pinions, racks, and associated elements arranged at opposite sides of the shaft, the racks associated with springs arranged below the shaft may be provided with extensions 22 and a roller 23, with which the lever 20 may be made to engage and cause the proper movement of the rack to deflect the spring associated therewith.

The action of the motor may be controlled, if desired, by a governor of any suitable type. In the drawings I have illustrated a worm 24 for driving the governor, the latter not being shown, as it forms no part of my invention.

Having fully described my invention, I claim—

1. In a spring-motor, a driving-shaft, a pinion arranged thereon and having a one-way connection therewith, a reciprocable rack operatively arranged with relation thereto, and a leaf-spring operatively associated with said rack.

2. In a spring-motor, a driving-shaft, a reciprocable element, means operatively interposed between said shaft and said reciprocable element for imparting rotation to the shaft from said reciprocable element, and a leaf-spring operatively associated with said reciprocable element.

3. In a spring-motor, a driving-shaft, a reciprocable element, means operatively interposed between said shaft and said reciprocable element for imparting rotation to the shaft from said reciprocable element, and a leaf-spring having a slip connection with said reciprocable element.

4. In a spring-motor, a driving-shaft, a reciprocable element, means operatively interposed between said shaft and said reciprocable element for imparting rotation to the shaft from said reciprocable element, and a leaf-spring having a self-adjusting connection with said reciprocable element.

5. In a spring-motor, a driving-shaft, a pinion loosely arranged thereon and having a one-way connection therewith, a reciprocable rack operatively arranged with relation to said pinion, and a leaf-spring connected to said rack by a variable connection to compensate for the inherent variation of working capacity of the spring.

6. In a spring-motor, a driving-shaft, a pinion arranged thereon and having a one-way connection therewith, a reciprocable rack operatively arranged with relation to said pinion, and a leaf-spring having a self-adjusting connection with said rack.

7. In a spring-motor, a driving-shaft, a leaf-spring, and means for transmitting energy to rotate said shaft, said spring having a slip connection with said means.

8. In a spring-motor, a driving-shaft, a pinion arranged thereon and having a one-way connection therewith, a reciprocable rack operatively arranged in relation to said pinion, and a leaf-spring having a slip connection with the said rack.

9. In a spring-motor, a ratchet driving-shaft, a pinion arranged thereon and having a one-way connection therewith, a reciprocable rack operatively arranged in relation thereto and a leaf-spring operatively associated with said rack.

10. In a spring-motor, a ratchet driving-shaft, a pinion arranged thereon and having a one-way connection therewith, a reciprocable rack operatively arranged in relation thereto, and a leaf-spring having a self-adjusting connection with said rack.

11. In a spring-motor, a ratchet driving-shaft, a pinion arranged thereon and having a one-way connection therewith, a reciprocable rack operatively arranged in relation thereto, and a leaf-spring having a slip connection with said rack.

12. In a spring-motor, a driving-shaft provided practically throughout its length with ratchet-teeth adapted to receive a plurality of pinions, pinions arranged on said shaft, a plurality of racks operatively arranged in relation to said pinions, and a plurality of leaf-springs associated with said racks.

13. In a spring-motor, a driving-shaft, a plurality of pinions arranged thereon and having a one-way connection therewith, a plurality of reciprocable racks operatively arranged in relation to said pinions, and a plurality of leaf-springs associated with said racks.

14. In a spring-motor, a driving-shaft provided practically throughout its length with ratchet-teeth adapted to receive a plurality of pinions, pinions arranged on said shaft, a plurality of racks operatively arranged in relation to said wheel, and a plurality of leaf-springs associated with said racks.

15. In a spring-motor, a driving-shaft, a plurality of pinions arranged thereon and having a one-way connection therewith, a plurality of reciprocable racks operatively arranged in relation to said pinions, and a plurality of leaf-springs having slip connection with said racks.

In testimony whereof I have hereunto set my hand in presence of two subscribing witnesses.

WILLIAM GLENN McGEE.

Witnesses:
 GEO. W. REA,
 GERTRUDE M. STUCKER.